United States Patent [19]

Klacik et al.

[11] Patent Number: 4,657,501
[45] Date of Patent: Apr. 14, 1987

[54] APPARATUS FOR CONTINUOUSLY DEPOSITING SORBITOL SWEETENED HARD CANDY

[75] Inventors: Kenneth J. Klacik, Spring Valley, N.Y.; Robert J. Vermesh, Stamford, Conn.; Paul R. Fronczkowski, Newton, N.J.; Sigismondo A. DeTora, Pearl River; Donald Mihalich, Brooklyn, both of N.Y.

[73] Assignee: Nabisco Brands, Parsiappny, N.J.

[21] Appl. No.: 819,780

[22] Filed: Jan. 16, 1986

[51] Int. Cl.$^4$ .................................................. B29C 33/02
[52] U.S. Cl. .................................. 425/379 R; 425/377; 425/461; 222/146.2; 426/515
[58] Field of Search ................ 425/379 R, 378 R, 377, 425/461; 222/146.2; 426/515

[56] References Cited

U.S. PATENT DOCUMENTS

| | | | |
|---|---|---|---|
| 1,802,605 | 4/1931 | Kemp | 425/379 R |
| 3,156,085 | 11/1964 | Jamieson | 264/177 F |
| 3,371,626 | 3/1968 | Hachtman | 426/515 |
| 3,427,685 | 2/1969 | Gove et al. | 425/379 R |
| 3,438,787 | 4/1969 | DuRoss | |
| 3,439,381 | 4/1969 | Plomp | 264/177 F |
| 3,452,394 | 7/1969 | McNeal, Jr. | 425/379 R |
| 3,461,495 | 8/1969 | Swickard et al. | 425/378 R |
| 3,738,845 | 6/1973 | Liebrand | |
| 3,951,894 | 7/1971 | Fairbanks | 425/377 |
| 3,976,247 | 8/1976 | Carmelo | 222/146.2 |
| 4,184,832 | 1/1980 | Cuff | 425/379 S |
| 4,229,484 | 10/1980 | Steels et al. | 426/279 |
| 4,241,092 | 12/1980 | Halik et al. | |
| 4,255,776 | 6/1985 | Ramamurthy | 425/461 |
| 4,318,677 | 3/1982 | Ullrich et al. | 425/379 R |
| 4,360,129 | 11/1982 | Brokaw et al. | 222/146.2 |
| 4,426,402 | 1/1984 | Kaupert | 426/515 |

FOREIGN PATENT DOCUMENTS 1403696 8/1975 United Kingdom .

Primary Examiner—Tim Miles
Attorney, Agent, or Firm—Richard Kornutik

[57] ABSTRACT

A machine for continuously depositing a sorbitol-sweetened hard candy confection which allows the manufacture of such hard candies in a continuous commercial high volume operation. The machine deposits the hard crystalline candies from an aqueous sorbitol solution having a crystalline seeding material therein, such that the sorbitol solution must be maintained in the depositing machine within a relatively narrow temperature range to prevent rapid thickening of the solution at too low temperatures and destruction of the crystalline seeding materials at too high temperatures. The machine includes a heated hopper for the aqueous sorbitol solution and a heated depositing base, through which the aqueous sorbitol solution is deposited through an array of nozzles into candy molds positioned thereunderneath. The depositing base is fabricated with heating medium passageways therein, through which a heating medium is circulated. The array of nozzles is secured in a recessed position in the depositing base such that the nozzles are also heated by the circulating heating medium. Moreover, a hot air heat gun also circulates heated air in the head space in the hopper above the aqueous sorbitol solution to maintain the upper surface of the solution in the narrow temperature range, to prevent a premature thickening or crusting of the solution on the upper surface thereof.

16 Claims, 21 Drawing Figures

APPARATUS FOR CONTINUOUSLY DEPOSITING SORBITOL SWEETENED HARD CANDY

BACKGROUND OF THE INVENTION

1. Field of the Invention

The present invention relates generally to apparatus for depositing a clear sorbitol sweetened hard candy, and more particularly pertains to a novel machine for depositing sorbitol sweetened clear hard candies on a continuous basis in a high volume commercial operation. The present invention is related to U.S. Pat. No 4,452,825, commonly assigned herewith, which discloses and claims a basic process pursuant to which the apparatus of the present invention is operated.

2. Discussion of the Prior Art

Over the years, there has been a demand in the confectionery industry for various reasons to produce a sugarless hard candy confection resembling ordinary hard candy in appearance and organoleptic qualities such as smoothness, non-tackiness, etc. Attempts have been made, for example, to replace sucrose, corn syrup, flavoring, and coloring with combinations of sorbitol, mannitol, and other materials including coloring and flavor.

While sorbitol is particularly suitable as a candy ingredient because of its close resemblance to sugar in sweetness and nutritive values, hard candy confections which include sorbitol are extremely difficult to prepare because of the inherent tendency of the candy pieces to remain soft and tacky instead of solidifying into hard candy as desired. At one time, hard candy made from sorbitol solution, crystalline sorbitol and crystalline mannitol usually included a gum, such as larch gum, acacia or tragacanth, in order to promote the "setting-up" or solidification of the confection. Since the inclusion of a gum necessitates relatively low cooking temperatures and a relatively high moisture content in the solution from which the confection is prepared in order to keep the gum suspended, the crystallization time for the confection is extremely long, frequently requiring as much as several days processing time. Moreover, when sorbitol-sweetened hard candy confections prepared with gum crystallize, clarity is destroyed because of the presence of the colloidally dispersed gum and by the surface crystallization of the sorbitol and mannitol.

Attempts to overcome some of the problems associated with the making of sorbitol-sweetened hard candy include processes such as that described in U.S. Pat. No. 3,438,787 to DuRoss in which an aqueous solution, containing sorbitol and not more than about one-fourth part by weight of mannitol per unit weight of sorbitol, is heated to reduce the moisture content to not more than 0.5% by weight of the solution before cooking to a temperature within the range of from 160° F. to 200° F. and seeding with no less than 0.5% by weight finely ground crystalline sorbitol, mannitol and/or carbohydrates to form a sugar-free hard candy after solidification in a controlled environment.

Another process is described in U.S. Pat. No. 3,371,626 to Hachtman wherein an aqueous solution of sorbitol is heated to a temperature above the melting point of sorbitol, sufficiently high to evaporate the water, and is then deposited into thin-walled cavities of a plastic mold while maintaining the temperature above the setting temperature but below the temperature at which the plastic mold cavity walls will heat-deform. This process was intended primarily to eliminate the need for starch molding which is a messy, dusty operation resulting in a cloudy starch coated product. Moreover, the plastic molds as taught herein are difficult to demold, crack easily and are insulative (causing increased set times).

Even though both of the processes described hereinabove reduce the time usually required for a confectionery aqueous sorbitol solution to set or solidify sufficiently to further process the hard candy units, such improved set times are still far in excess of a solidifying time which is appropriate for a high volume production of sorbitol-sweetened hard candy units. The DuRoss process takes at least an hour to yield a hard candy product, while the Hachtman method requires eight hours. Another method described in U.K. Pat. No. 1,403,696 to ICI includes melting sorbitol and mannitol crystals using only an amount of water sufficient to effect solution of the crystals. According to this disclosure a set time of fifteen minutes may be attained if the temperature of the melt is 140° F. when placed in the molds. However, at a temperature of only 140° F., the viscosity of the melt would be predictably so high as to effectively preclude processing on a continuous basis.

Other disclosures such as U.S. Pat. No. 3,738,845 to Liebrand and U.S. Pat. No. 4,241,092 to Halik, et al. show variations in cooking and processing in order to achieve different product results.

Candy depositing machines similar in some respects to those of the present invention are commercially available from Baker Perkins Holdings Limited, and U.S. Pat. No. 4,229,484 illustrates some details thereof of a typical machine. These commercially available depositing machines are constructed and designed to deposit many standard confectionery solutions in a very satisfactory manner. However, these machines are not suitable for depositing an aqueous sorbitol solution having therein a crystalline seeding material, as the commercially available machines are not capable of maintaining the solution within a relatively narrow temperature range required by the solution. The hoppers in these machines are frequently provided with a heating jacket therearound through which a heating medium is circulated. However, the depositing base of the machine is not provided with separate heaters therein, and the individual depositing nozzles extend and project downwardly for some distance (e.g. several inches) beneath the base. The individual nozzles of these machines are thus cooled to a great extent by the ambient air therearound, which results in rather fast thickening (large increase in viscosity) of the aqueous sorbitol solution therein and consequential blocking of the nozzles by the highly viscous solution. Moreover, the aqueous sorbitol solution is not adequately heated within the hopper, resulting in a "skinning" thick layer caused by cooling of the solution by the ambient air which results in an unacceptable increase in viscosity. Thus, a crust of highly viscous material forms on the upper surface of the sorbitol solution, interfering with continuous high volume depositing operations by a machine of that nature. Also, the components of these machines, such as the nozzles, the pumping rods, the pumping sleeves associated therewith, and the ball valves therein are frequently fabricated from materials, such as brass or copper, which are not fully suitable for use in the practice of the present invention as they tarnish and corrode due to acidulants used in processing.

SUMMARY OF THE INVENTION

Accordingly, it is a primary object of the present invention to provide a machine for continuously depositing a sorbitol-sweetened hard candy confection having a clear glass-like appearance and excellent mouth feel.

A further object of the subject invention is the provision of a machine of the aforementioned type which allows the manufacture of such hard candies in a continuous commercial high volume operation.

In accordance with the teachings herein, the present invention provides a machine for depositing a hard crystalline candy from an aqueous sorbitol solution having therein a crystalline seeding material therein, such that the sorbitol solution must be maintained in the depositing machine within a relatively narrow temperature range to prevent rapid thickening of the solution at too low temperatures and destruction of the crystalline seeding materials at too high temperatures.

The machine includes a depositing base, through which the aqueous sorbitol solution is deposited through an array of nozzles into candy molds positioned therebeneath. The depositing base is fabricated with heating medium passageways therein, through which a heating medium is circulated to maintain the aqueous sorbitol solution in the desired narrow temperature range. A plurality of depositing nozzles are supported in the depositing base to deposit the aqueous sorbitol solution into the candy molds, with each nozzle being secured in a recessed position in the depositing base. In this arrangement, the nozzles are also heated by the heating medium circulating through the base to maintain the aqueous sorbitol solution in the preferred narrow temperature range while it is being deposited through the nozzles. The recessed nozzles prevent heat loss and subsequent thickening of the product which would cause the product to "tail", unacceptable tablets.

The machine is provided with a heated hopper above the base for supplying the aqueous sorbitol solution thereto. The hopper is heated by a heating jacket, through which a heating medium is circulated to maintain the aqueous sorbitol solution in the desired narrow temperature range. Moreover, a hot air heat gun also circulates heated air in the head space in the hopper above the aqueous sorbitol solution to maintain the upper surface of the solution in the narrow temperature range, to prevent a premature thickening or crusting of the solution on the upper surface thereof.

The machine is provided with a plurality of piston rods, one for actuating each nozzle, which extend downwardly through the hopper to a pump assembly associated with each depositing nozzle. Each depositing nozzle has a ball valve which is hydraulically actuated by a piston rod during a depositing operation. Moreover, heated air from the heat gun is directed by a duct against the upper ends of the piston rods to cause a conduction of heat therethrough to the aqueous sorbitol solution to assist in maintaining the solution in the preferred narrow temperature range.

Prior to initiating depositing operations, the machine is preheated during a preheating period in which the heating medium is circulated through the depositing base and hopper. During this period, the heat gun also supplies circulating heated air inside the hopper cavity and against the upper ends of said piston rods, such that the apparatus is preheated prior to initiating depositing operations.

In a preferred embodiment, each depositing nozzle comprises a four point nozzle having a rectangular array of four depositing apertures therein, and each depositing aperture has an annular beveled surface extending around its lower end to form a frusto-conical surface therearound, with the annular beveled frusto-conical surface being provided to prevent an accumulation of deposited aqueous sorbitol solution at the lower end of the depositing aperture. The nozzles are not limited to four point nozzles, and in other embodiments alternative nozzles might typically include one to five or more points. Moreover, each depositiong nozzle has a bridge on the lower surface thereof, extending between pairs of the four depositing apertures, with the bridge effectively blocking any flow of air between the pairs of apertures, to prevent cooling thereof by the air flow. In greater detail, each depositing nozzle is constructed with a central valve passageway extending therethrough, positioned centrally between the four depositing apertures. A ball valve element is positioned in the central passageway, and is urged upwardly by a biasing spring in compression therebeneath, urging the ball element upwardly against an annular valve seat. Each piston rod has an annular seat extending around its lower end, and an O ring is positioned in the annular seat to seal the piston rod relative to a pumping sleeve in a pumping assembly. In operation, each ball valve is actuated open by a piston rod pushing downwardly through a pumping sleeve, hydraulically pushing the ball valve element away from the valve seat, and pumping the aqueous sorbitol solution around the ball through the four valve apertures, to be deposited in an associated candy mold positioned therebeneath.

In a preferred embodiment of the depositing machine, a plurality of mold elements are formed into an endless conveyor carrier to be passed beneath the depositing base during successive depositing operations. Each mold element has at least one linear array of candy molds therein, and the depositing base has a corresponding linear array of nozzles positioned above the linear array of candy molds. Moreover, each depositing nozzle is aligned in the same direction in the depositing base such that the bridge between pairs of the nozzle apertures extends perpendicular to the direction of the linear array of nozzles, to effectively prevent a flow of cooling air by the nozzle apertures.

In preferred embodiments of the subject invention, the limited temperature range is between 160° F. and 200° F., and is preferably between 191° F. and 194° F.

BRIEF DESCRIPTION OF THE DRAWINGS

The foregoing objects and advantages of the present invention for a machine for continuously depositing sorbitol-sweetened hard candy may be more readily understood by one skilled in the art, with reference being had to the following detailed description of a preferred embodiment thereof, taken in conjunction with the accompanying drawings wherein like elements are designated by identical reference numerals throughout the several views, and in which.

s a side elevational view of

Figure 10:
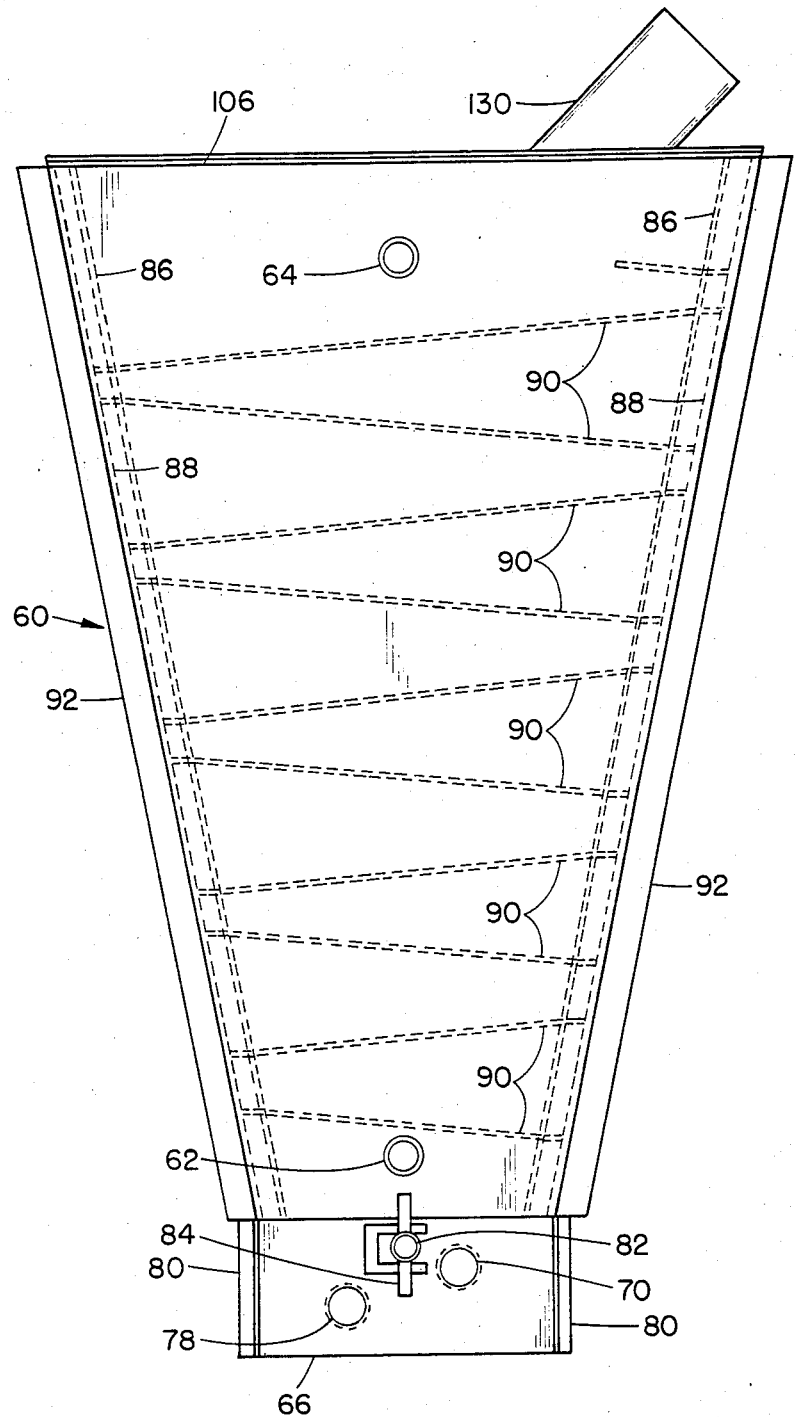
Figure 11:
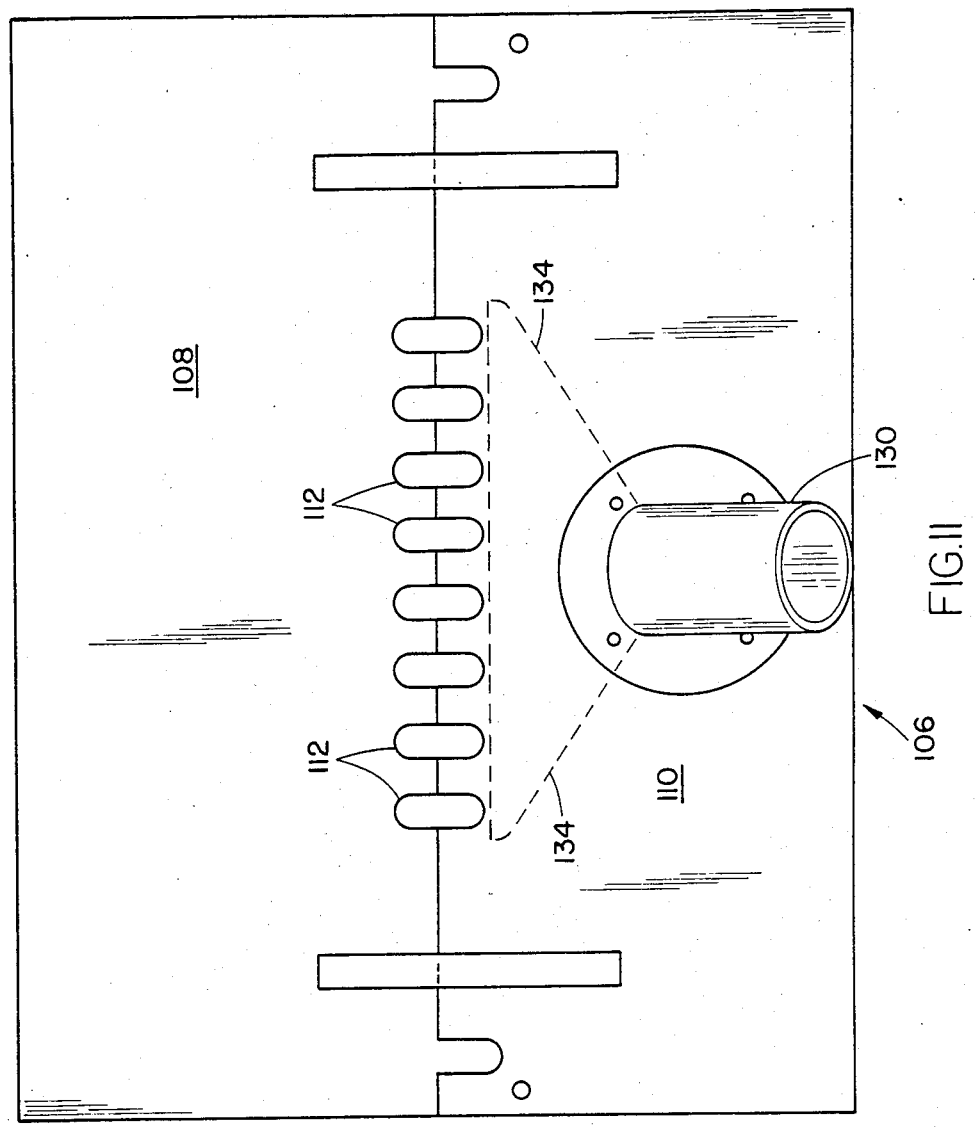
Figure 12:
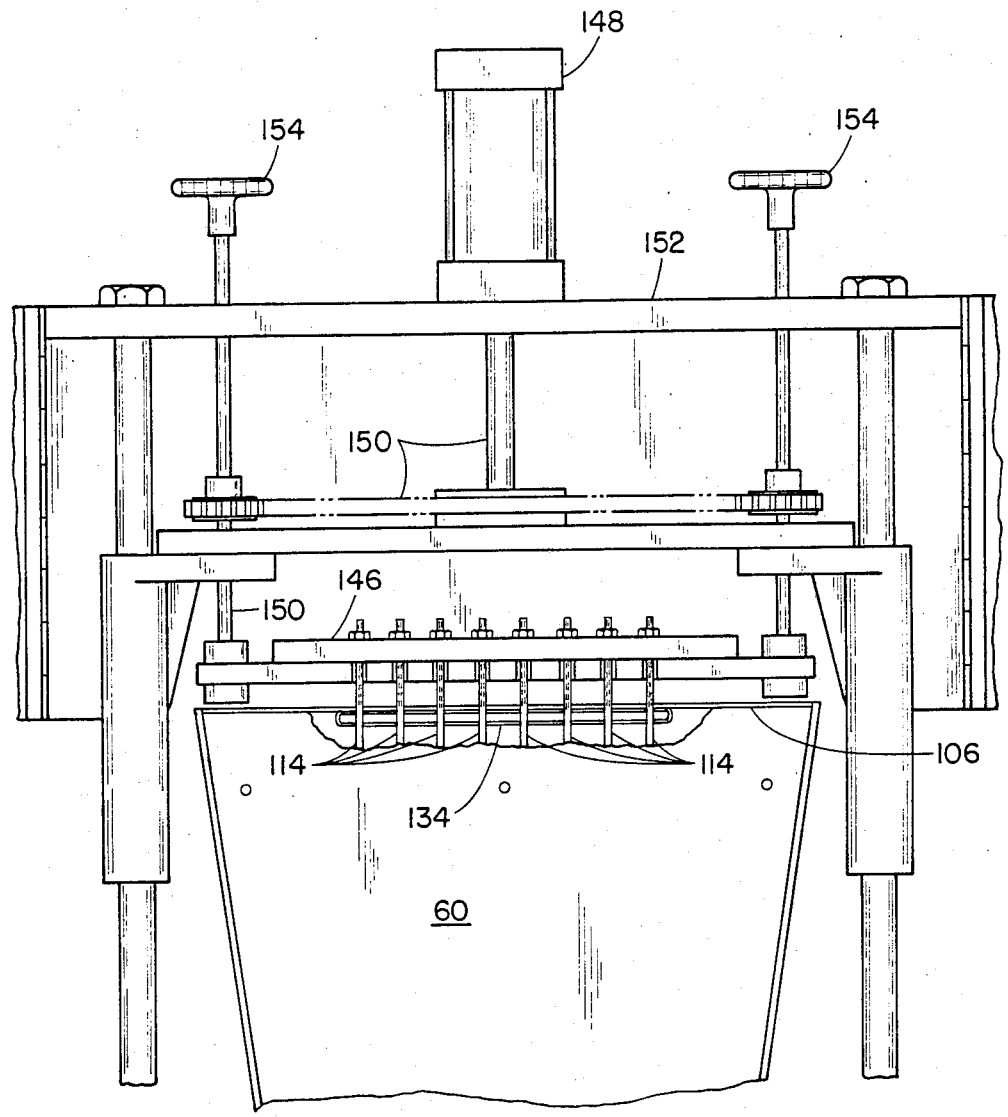
Figure 13:
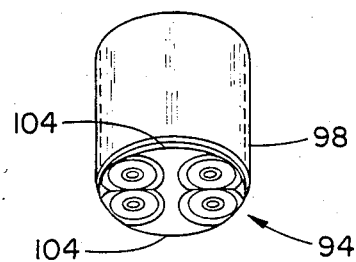
Figure 14:
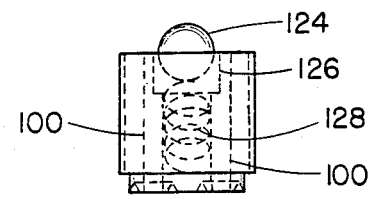
Figure 15:
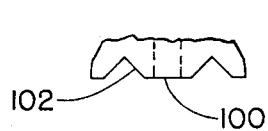
Figure 16:
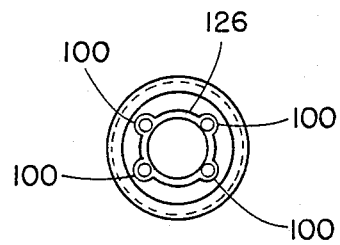
Figure 17:
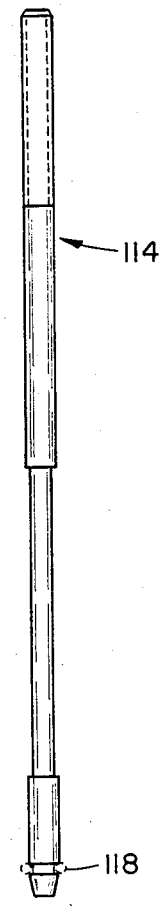
Figure 18:
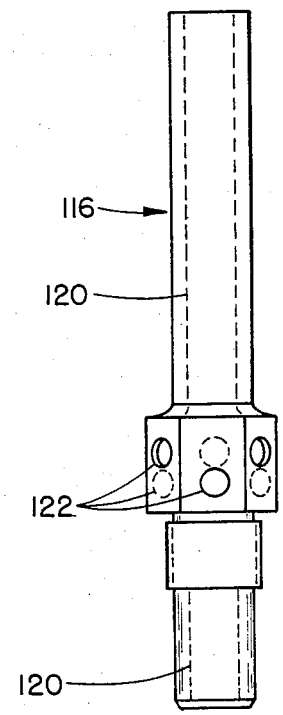
Figure 19:
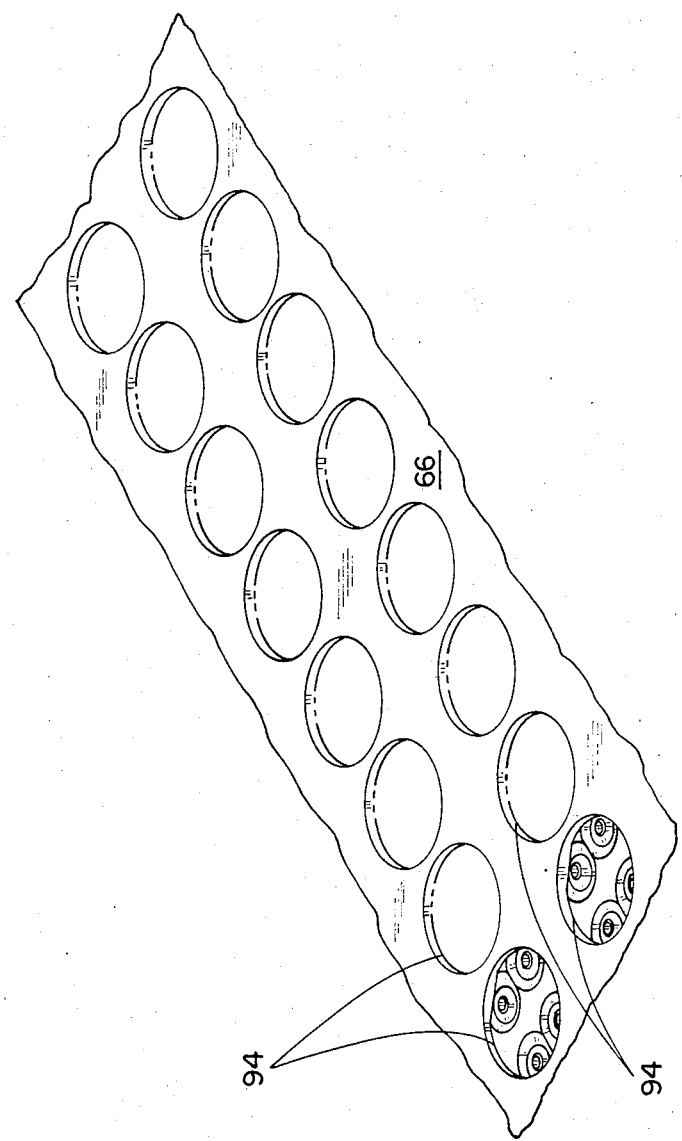
Figure 20:
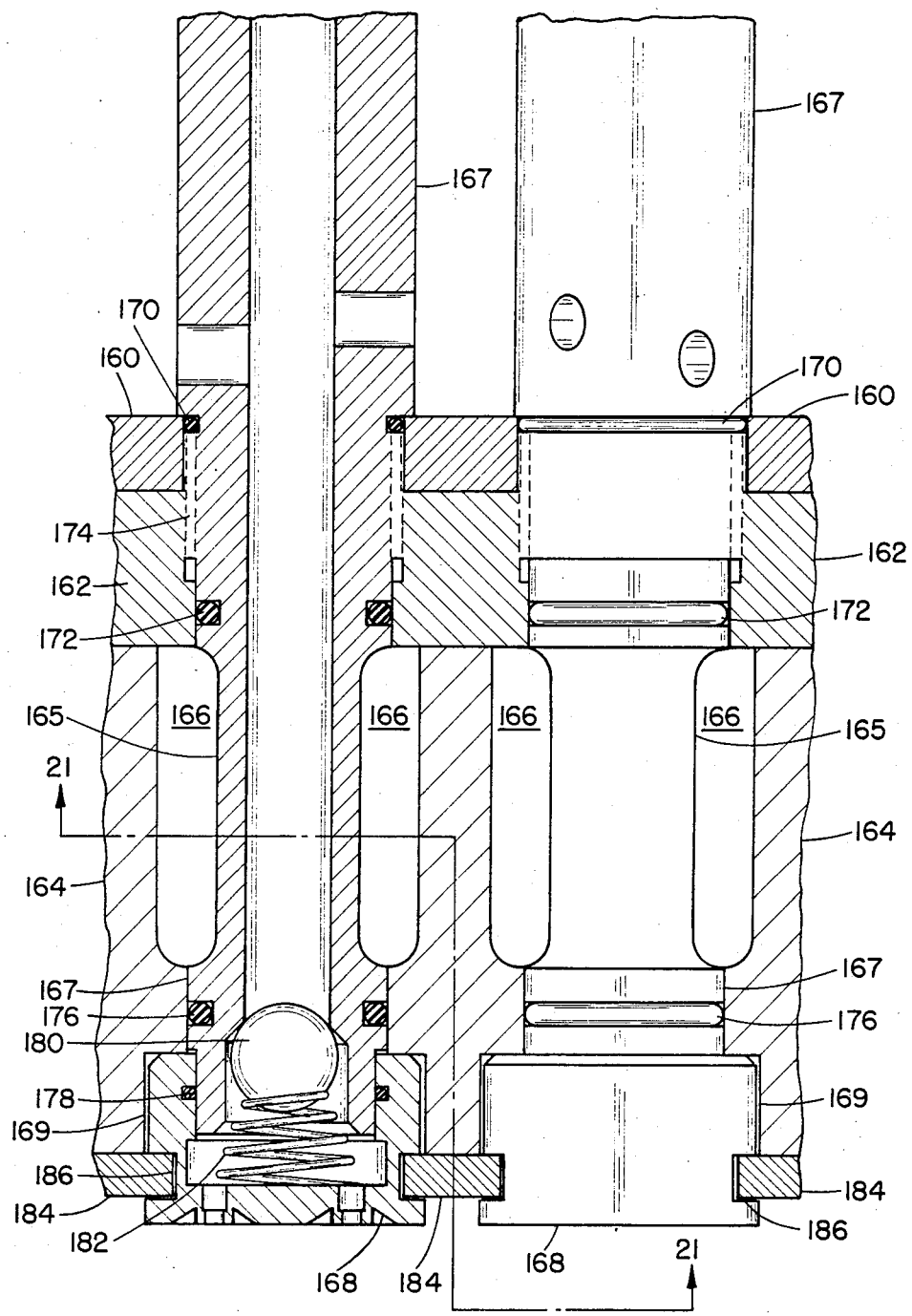
Figure 21:
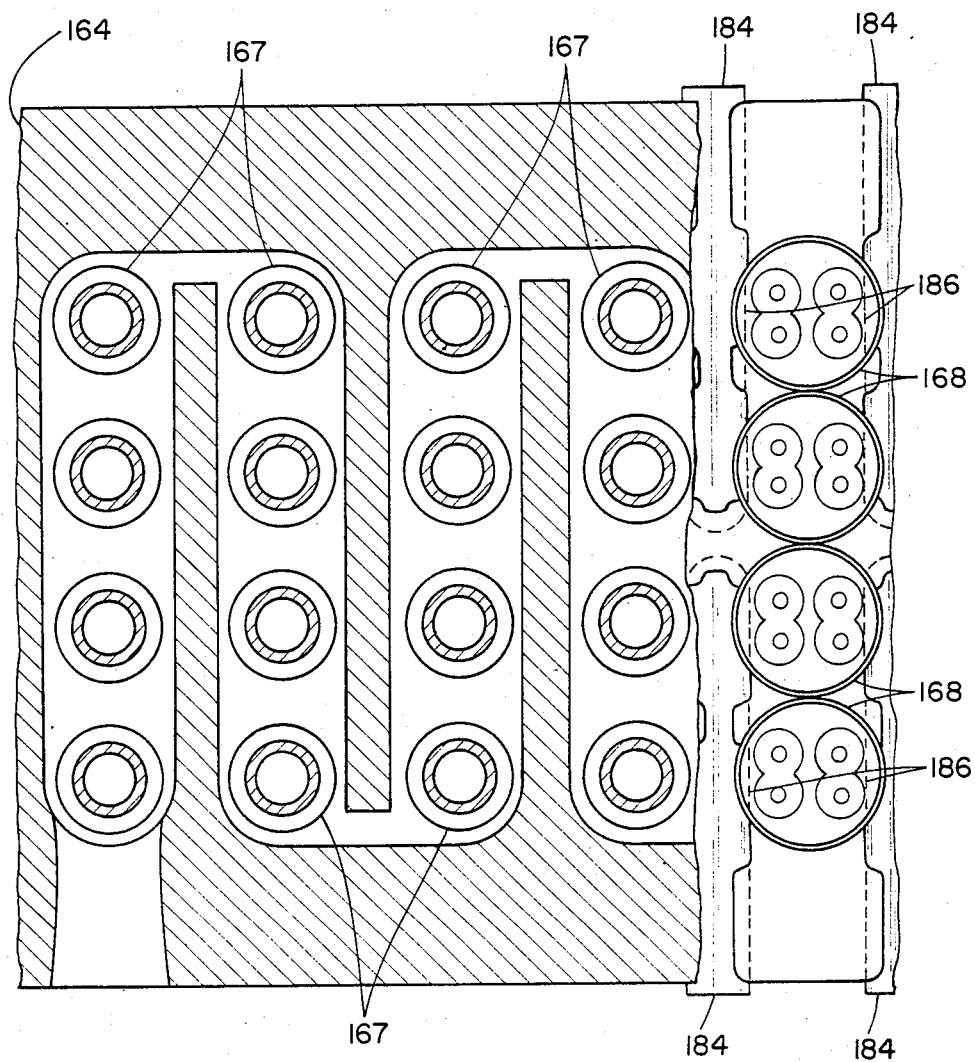

FIG. 10 illustrates a side elevational view of the hopper and depositing head of the machine;

FIG. 11 is a top plan view of a cover for the hopper, and illustrates a heat gun input and duct;

FIG. 12 illustrates a front elevational view of the top of the hopper, the piston rods extending downwardly therein, and the hopper top cover and hot air duct;

FIG. 13 is a perspective view of a preferred embodiment of an injection nozzle for use in the depositing machine of the subject invention;

FIGS. 14, 15, and 16 are respectively side elevational, enlarged detail, and top plan views of the injection nozzle of FIG. 13;

FIG. 17 is an illustration of a preferred embodiment of a piston rod for use in the depositing machine of the present invention;

FIG. 18 illustrates a preferred embodiment of a pump assembly for use in association with the piston rod of FIG. 17;

FIG. 19 is a partially fragmented bottom view of the depositing head illustrating the array of nozzles mounted recessed therein;

FIG. 20 is a partially fragmented and sectional view of another embodiment of a depositing base wherein the pump assemblies extend through the heating medium channels such that they are directly immersed in and heated by the heating medium; and FIG. 21 is a partially fragmented and sectional view of the embodiment of FIG. 20 taken generally along line 21—21 therein.

DETAILED DESCRIPTION OF THE INVENTION

The clear amorphous sugar-free hard candy produced by the depositing machine of the present invention is prepared from an aqueous solution of sorbitol having a mannitol content of less than about 3%, and preferably less than about 1% by weight based on the weight of the starting solution. This aqueous sorbitol solution is then heated to evaporate off the water, e.g., in a reduced-pressure atmosphere such as a partial vacuum, until the moisture content of the resulting sorbitol mass is less than about 5%, and preferably less than about 3%, but, in any event, the remaining moisture level is greater than at least about 0.5%, and, preferably, greater than about 1.0%.

After heating to reduce the moisture content, the resulting mass or syrup can be brought to a temperature of from 240° F. to about 310° F., after which a coloring agent can be added, which is generally a concentrated aqueous dye, a flavoring agent and an acid such as malic acid, lactic acid, tartaric acid, and citric acid in order to effect uniform and thorough incorporation into the sorbitol mass. The coloring agent is added in an amount of from about 0.02% to about 1.5% based on weight, and preferably from about 0.04% to about 1.0%, while the acid flavoring is included in an amount from about 0.6% to about 2.0% and preferably from 0.7% to about 1.75% based on weight.

Upon addition of the dye and acid flavorants at elevated temperatures, the mass is cooled to a temperature of from about 160° F. to about 200° F. after which the sorbitol mass is provided with crystal nucleation sites sufficient to obtain a set time of no more than about 30 minutes in a metal mold. Heterogeneous nucleation is achieved by incorporating finely ground crystalline material, e.g., sorbitol, mannitol, or other carbohydrates in an amount not more than about 0.4% based on the weight of the mass (heterogeneous nucleation). The seeding material should be mixed in the mass as thoroughly as possible in the absence of excess mechanical shear, which tends to induce crystallization of the mass in the holding tank or hopper.

Homogeneous or intranucleation may be provided by applying a nucleation initiator-promoter to the sorbitol mass without the addition of external materials. Such initiator-promoters include but are not limited to high speed stirring or mixing, microwaves, supersonic energy, etc.

The nucleated sorbitol mass is maintained at an elevated temperature in a depositing hopper wherein the hopper, depositing head and nozzles, which are selected based on minimum production of excess mechanical shear, are also heated to a temperature sufficient to keep the mass in a molten condition in the preferred narrow temperature range.

The melt is then deposited into a metal mold to form individual units of sorbitol-sweetened, sugar-free hard candy. While the cavities of the metal mold can be of any particular design, it has been found that an annular shape produces a candy unit which is particularly pleasing in appearance and mouth feel. The metal mold should be heated to a temperature of between about 70° F. and 120° F. and, particularly, between about 75° F. to about 90° F. before the melt is deposited into the cavities in order to prevent supercooling thereof.

It has been found that a mold made of aluminum and coated with polytetrafluoroethylene, PTFE, is particularly well suited for effecting rapid solidification or setting of the sorbitol mass sufficiently for further processing and handling. The metal and PTFE-coated mold act as a heat sink to conduct heat away from the deposited material, which also is allowed to escape by convection from the exposed top surface to the ambient atmosphere. This approach is directly opposite to the long-term setting time required with starch-mogul and plastic molds which are insulative in nature relative to the deposited material in the cavities.

The present invention provides apparatus for depositiong a sugar-free clear hard candy on a commercial basis by continuously depositing the prepared sorbitol mass, and then demolding the candy units for further handling, allowing for no more than about thirty minutes solidification or "set" time. Consequently, the number of required molds, as well as the space for the racking-deracking system, the setting space for filled molds, and the accompanying labor costs, are all reduced. Moreover, when the metal depositing molds are provided with demolding push pins in the Teflon coated mold as is preferred, and the relative humidity of the air is roughly equivalent to the equilibrium relative humidity (ERH) of the deposited candy, the hard candy unit produced can be automatically released quickly and easily by merely depressing the push pins.

Figure 1:
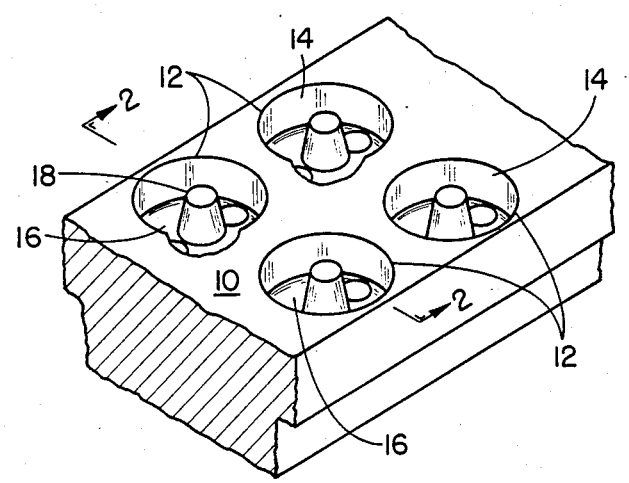
FIG. 1 is a perspective fragmentary view of a preferred mold for use with the present invention.
Figure 2:
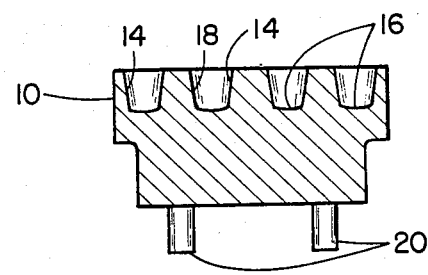
FIG. 2 is a sectional view of the mold shown in FIG. 1 taken along line 2—2 therein.
Figure 3:
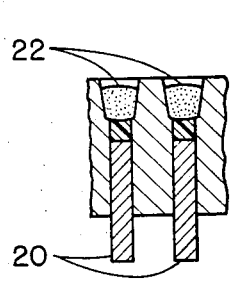
FIG. 3 is a sectional view similar to that of FIG. 2, but taken at an angle of 90° to FIG. 2 and showing the cavity filled with confectionery solution.
Figure 4:
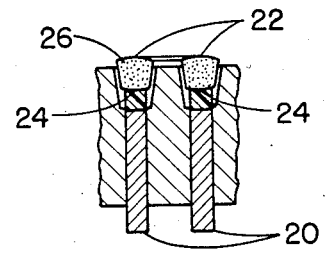
FIG. 4 shows the cavity of FIG. 3 during ejection of a set candy unit.

Referring to FIG. 1, a preferred metal mold 10 has cavities 12 which are generally annular in shape with a smooth gently-curved bottom 16 and continuous generally vertical walls 14 having a slight nonvertical taper from 1° to 9°, with 3° being preferred. With this cavity shape, a hard candy unit having a generally smooth gently rounded lower surface 24 is provided. Each mold 10 typically includes two linear arrays of cavities 12, with there typically being eight cavities in each linear array, only two cavities of which are illustrated by the fragmentary view of FIG. 1.

In order to achieve a smooth gently curved top surface 22 which does not have sharp edges, it is desirable that a means for forming a top surface meniscus be included within the individual cavities 12. An example of such a meniscus-forming feature is a post 18 extending upwardly from the bottom of the cavity at a point situated generally concentrically in the cavity 12. The combination of the top meniscus and the molded bottom results in a smooth overall organoleptically pleasing mouth feel. The mold cavity is Teflon coated so there is no adherance of the Sorbitol melt to the wall.

During the formation of the molten sorbitol material, the viscosity of the melt is such that when deposited directly into the center of the mold cavity the surface tension of the material between the side wall and the center post forms the upwardly-curved meniscus 22 with no sharp edges thereon. Unlike a plastic mold, it is believed that the PTFE-coated metal mold has a reduced attraction for the melt, thus allowing the desired meniscus to form. Moreover, this preferred mold cavity shape affords increased surface area for cooling by conduction.

Figure 5:
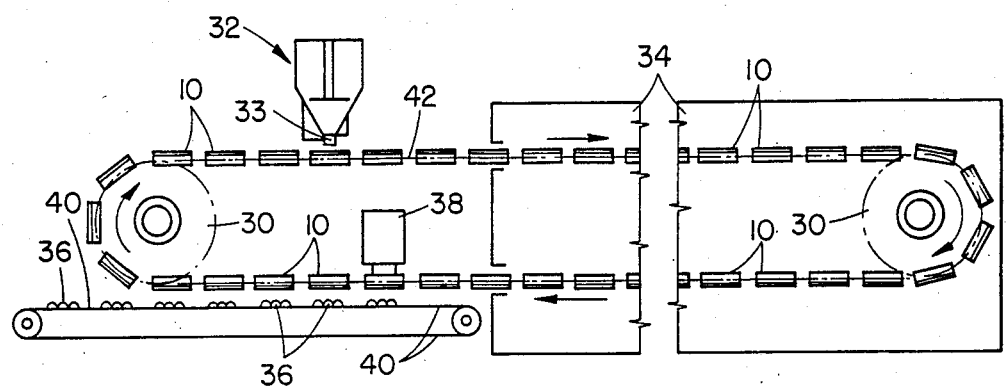
FIG. 5 is a schematic illustration of a prior art depositing machine for confectionery products.

In operation, when an external seeding material is used, an amount of no more than about 0.4% is needed to obtain the desired 30 minute set time, and in all presently known cases a set time of about 15 to 20 minutes has been achieved when air at 70°-90° F. and about 35% relative humidity is blown across the molds. Consequently, the metal molds can conveniently be arranged on a continuous belt, as illustrated in FIG. 5, which allows for a 15-20 minute travel time of the deposited sorbitol material before demolding. Ideally, the individual cavities are provided with push-pins 20 which can be automatically depressed to eject the "set" deposited sugar-free hard candy units at the end of the 15-20 minute solidifying travel time before being returned by the continuous belt to the depositing point of the sorbitol-containing melt. This process reduces the number of required molds, eliminates the need for extensive setting space and manual demolding efforts, thus reducing time, space, and labor requirements.

The continuity of this operation is enhanced by the ability to deposit the sorbitol mass at a temperature of from about 160° F. to about 200° F., preferably from about 185° F. to about 195° F., and most preferably from about 191° F. to 194° F., at which temperature the viscosity is very low thus allowing rapid and efficient depositing of the sorbitol material. This is in contrast to the U. K. Pat. No. 1,403,696 patent which discloses a set time of more than 12 hours when the temperature of the deposited melt is 180° F.

Figure 6:
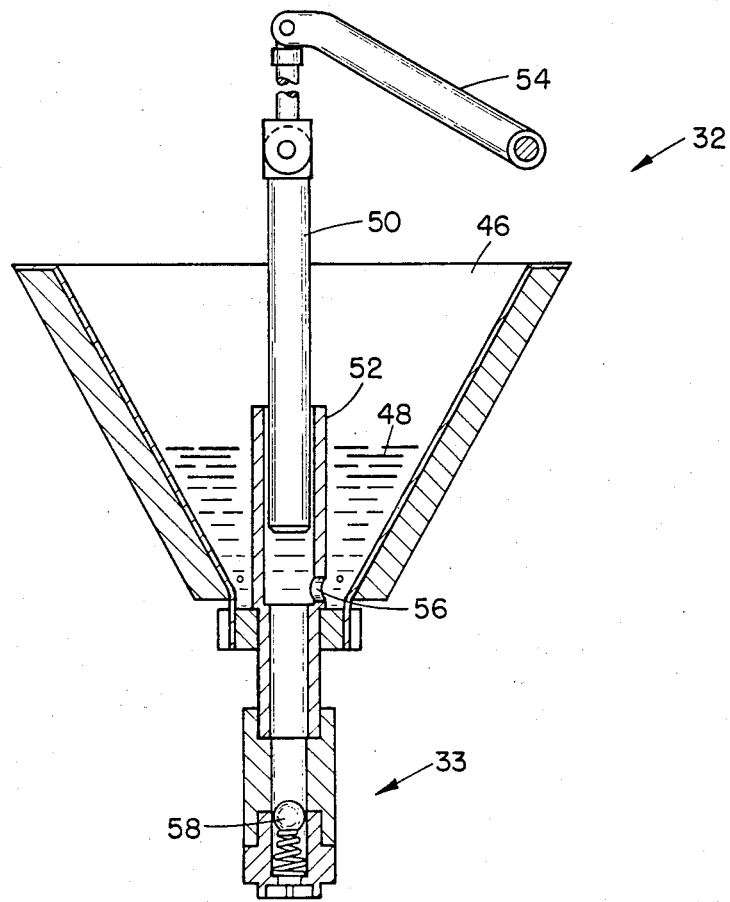
FIG. 6 is a schematic illustration of one depositing nozzle as used in a prior art machine of the type illustrated in FIG. 5.

FIGS. 5 and 6 illustrate typical prior art depositing apparatus for depositing normal confectionery solutions into molds therefor. Referring to FIG. 5, a procession of tray molds 10 are advanced by an intermittently moving chain conveyor, including a pair of parallel chains, which extend around end sprockets 30, one of which is driven. The pair of parallel chains are connected to opposite ends of the trays 10 to intermittently drive them beneath a depositor 32 having a plurality of depositing nozzles 33 which deposit confectionery solution into the molds 12 in the trays while the trays intermittently travel along the upper run of the conveyor. After leaving the depositor 32, the trays pass through a cooling enclosure 34. Towards the end of the lower run of the conveyor the cooled candies 36 are discharged from the mold cavities by a demolding device 38 onto a discharge belt 40. The tray molds 10 are typically connected at their opposite ends to the chains of the conveyor by fasteners which pass through holes in the trays to engage brackets attached to the chains.

The depositor 32 is illustrated in more detail in FIG. 6, and the nozzles 33 (only one of which illustrated in detail), are disposed in a row extending transversely to the direction of travel of the conveyor, with each serving to deposit confectionery into one of the mold cavities 12 in each mold 10. The depositor can include a heated hopper 46 containing confectionery material 48 and a plunger 50 for each nozzle 33 which is reciprocatable in a sleeve 52 by a mechanically operated lever 54.

In the upper position of the plunger 50, the portion of the sleeve 52 beneath the plunger fills with material from the hopper through inlet ports 56 in the sleeve. When the plunger moves down, it closes the inlet ports 56, and discharges material to the associated nozzle 33 through a spring-loaded ball valve 58. Each nozzle 33 of the depositor 32 operates simultaneously at each dwell of the chain conveyor to make deposits in corresponding cavities 12 of the molds 10. The prior art includes continuously moving chains with swinging hoppers which track the molds travel, and depositing takes place at a specific point in the arc along which they travel.

Candy depositing machines of the type illustrated in FIGS. 5 and 6 are commercially available from Baker Perkins Holdings Limited. These commercially available depositing machines are constructed and designed to deposit many standard confectionery solutions in a very satisfactory manner. Unfortunately, these machines are not suitable for depositing an aqueous sorbitol solution having therein a crystalline seeding material as the commercially available machines are not capable of maintaining the solution within the relatively narrow temperature range required by the solution. The depositing base of the machine is not provided with heating medium passageways formed therein, and the individual depositing nozzles extend and project downwardly for some distance (e.g. several inches) beneath the base. The individual nozzles of these machines are thus cooled to a great extent by the ambient air therearound, which results in rather fast thickening of the aqueous sorbitol solution therein and consequential blocking of the nozzles by the viscous solution. Moreover, the aqueous sorbitol solution is not adequately heated within the hopper, and a thickened layer, or crust of viscous material, forms on the upper surface of the sorbitol solution therein, thus interfering with continuous, high volume depositing operations by a machine of that nature. Also, the components of these machines, such as the nozzles, the upper pumping sleeves associated therewith, and the ball valves therein are frequently fabricated from materials such as brass or cooper which are not wholly suitable for use in the practice of the present invention as they frequently tarnish and corrode because of the acidulants used in the process.

Figure 7:
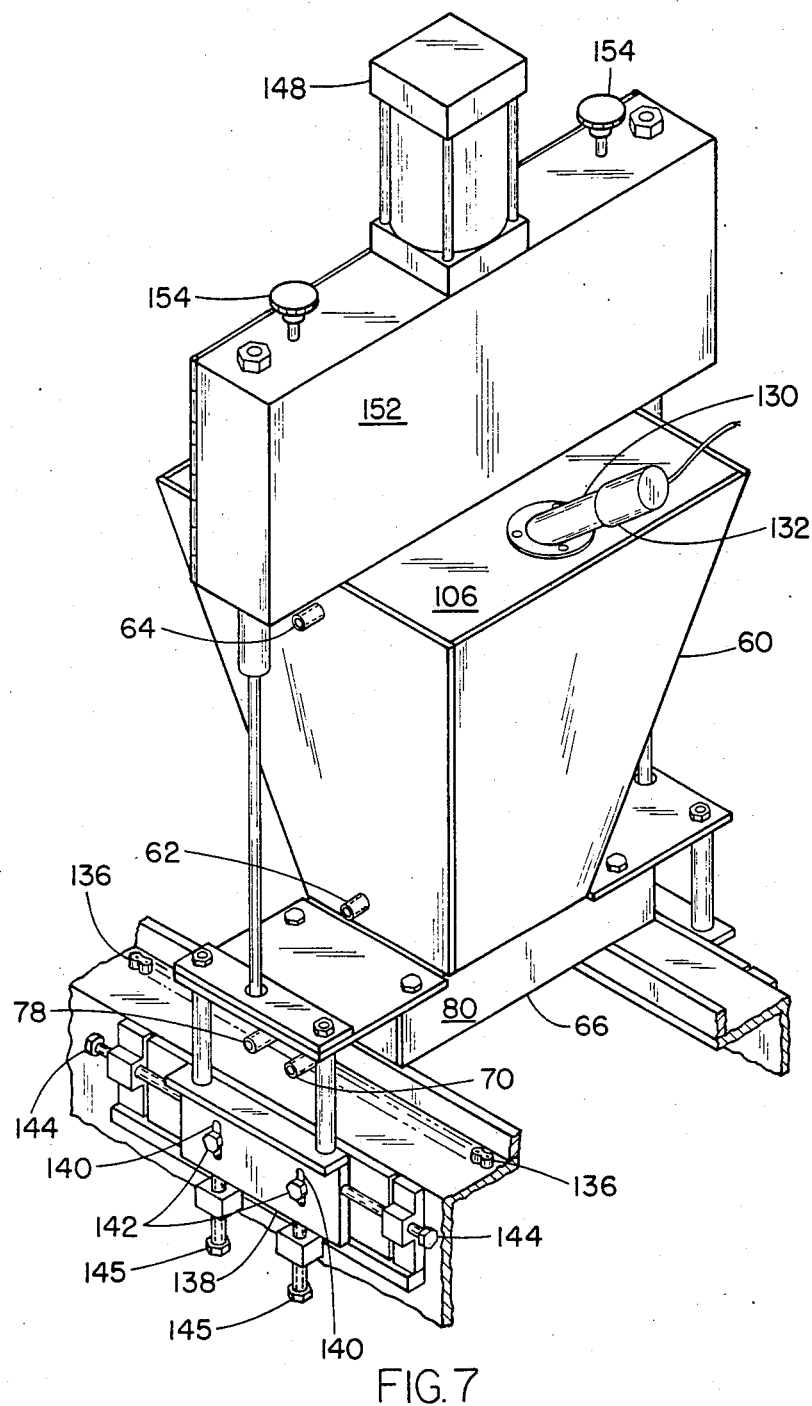
FIG. 7 is a side perspective view of a preferred embodiment of a machine for depositing a sorbitol-sweetened hard candy pursuant to the present invention.

FIG. 7 illustrates a side perspective view of a depositing machine constructed pursuant to the teachings of the present invention, which operates in an overall manner similar to the machine of FIG. 5. The depositing machine includes a heated and insulated hopper 60. A source of a suitable heating medium (e.g. water), such as a commercially available Mokon water heater/recirculator, supplies the heating medium at a precisely regulated temperature (e.g. ±1.0°F.) to an inlet 62 to a heating medium jacket around the hopper. The heating medium circulates through passages in the jacket around the hopper to an outlet 64 near the top thereof, from which it is returned to the heater/recirculator in a continuous heating process. In alternative embodiments the heating medium is not limited to hot water, and could, for example, be hot oil which can be heated to achieve temperatures up to approximately 400° F., when depositing other types of confectionery solutions.

Figure 8:
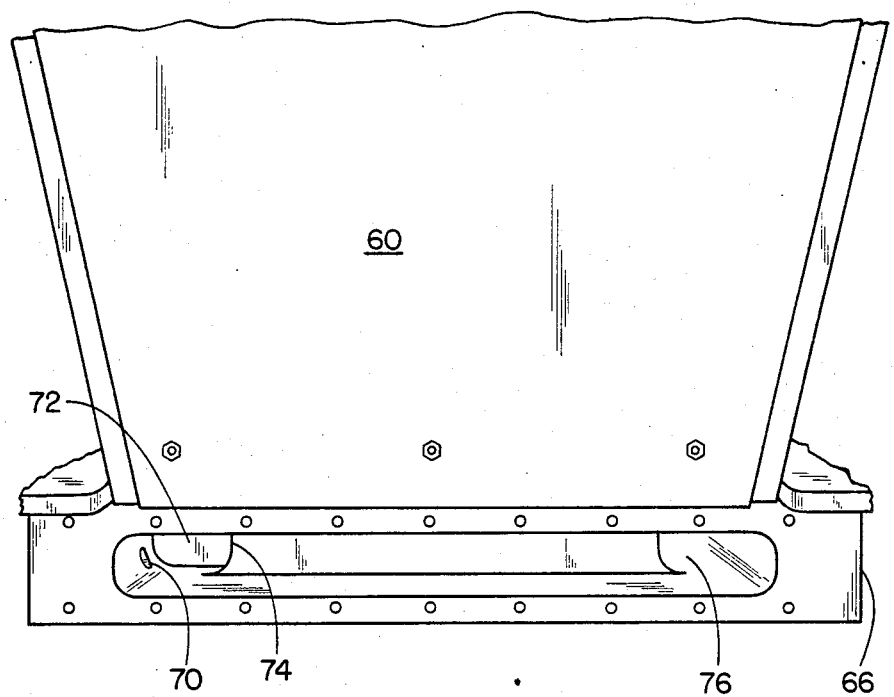
FIG. 8 is a side perspective view of the depositing head block of the machine with the side cover plate removed, and illustrates the manifold through which the heating medium flows.
Figure 9:
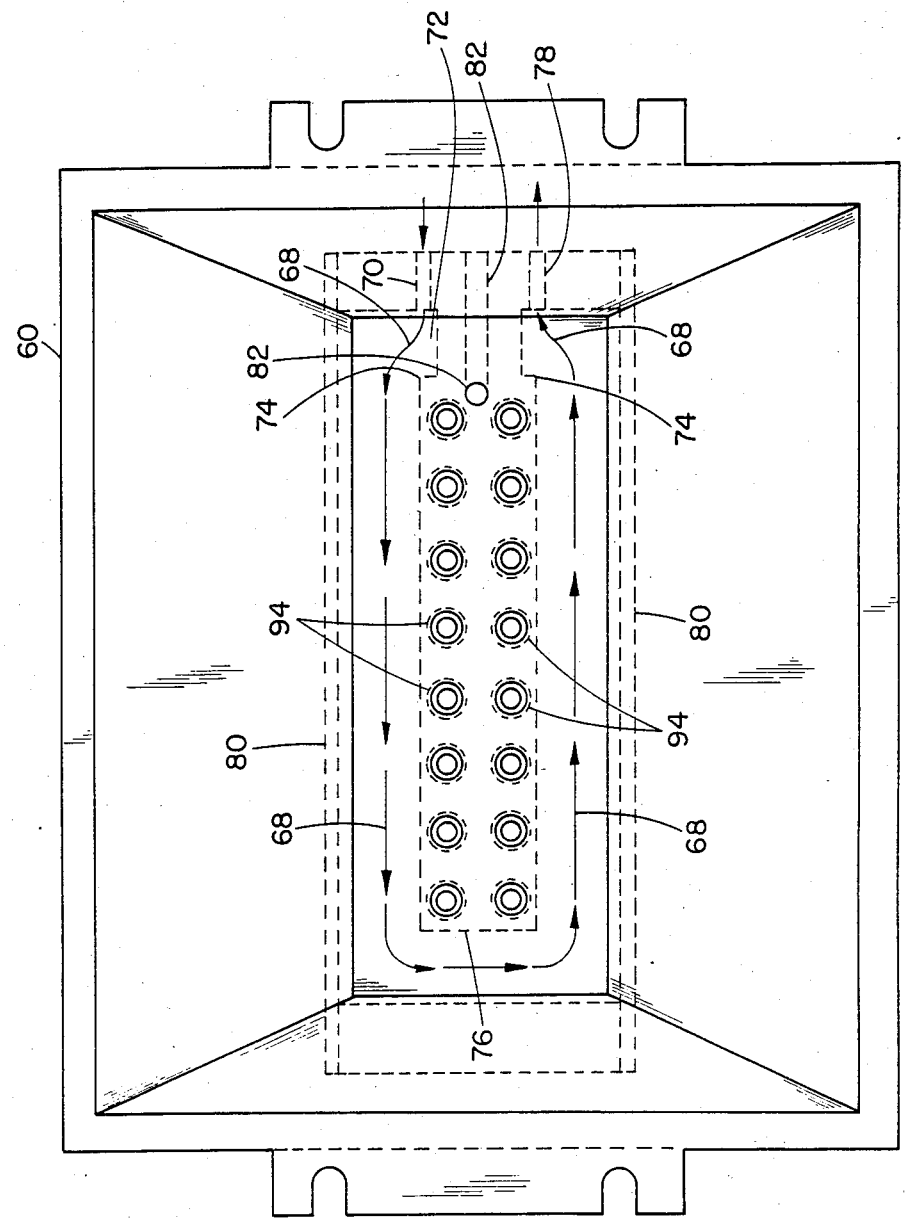
FIG. 9 illustrates a top plan view of the hopper of the machine of FIG. 7, and illustrates in phantom the heating medium manifold and flow therethrough.

The heater/recirculator also supplies the precisely heated medium to a heating manifold in a heated depositing base 66 positioned below the hopper. FIG. 8 is a side perspective view of the heating medium flow manifold on one side of the depositing base, with the flow manifold on the opposite side being substantially symmetrical with that shown in FIG. 8. A manifold cover 80 has been removed from the side of the manifold to illustrate details of the interior thereof. FIG. 9 is a top plan view of the hopper, and illustrates in phantom the heating medium circulation system in the depositing base, with the flow of heating medium being illustrated by arrows 68 therein. The heating medium flows in through an inlet pipe and port 70 into a milled out portion 72. The edge 74 of the milled out section 72 introduces a certain amount of turbulence into the flow of the heating medium to increase the heat transfer characteristics of the system, and the milled out section 72 carries the heating medium closer to the nozzles in the depositing head. The heating medium then flows along one side of the depositing machine head, through a bored through rear port 76, and then back along the other side of the head to a heating medium outlet pipe and port 78. A side cover plate 80 is placed over each side of the depositing head to seal the heating medium circulation system. A product drain duct 82 is also provided, opening to the bottom front of the hopper to provide for draining of the hopper by opening of valve 84 by an operator.

FIG. 10 illustrates a side elevational view of the hopper 60 mounted on top of the depositing base 66. The aqueous sorbitol solution is stored within inner stainless steel sheet metal walls 86, which form a water jacket around the hopper with outer stainless steel sheet metal walls 88. A plurality of upwardly slanted heating medium guide walls 90 are placed between the inner and outer stainless steel walls to ensure that the heating medium flows from its inlet 62 circumferentially around the inner stainless steel walls of the hopper to the outlet 64. The water jacket outer sheet metal wall 88 is surrounded by outer sheets 92 of insulation to assist in maintaining the aqueous sorbitol solution within the hopper in the preferred narrow temperature range.

The heated depositing base 66 mounts therein two linear arrays of eight depositing nozzles 94, as illustrated generally in FIG. 9, mounted recessed in the bottom of the depositing base in a manner as illustrated in FIG. 19, which is an inverted bottom view thereof. Each individual nozzle 94 is formed with external threads 98, FIG. 13, which threadedly engage similar internal threads in the depositing base. In this arrangement, each nozzle is seated and secured in a recessed position in the depositing base, with the lower surface of each nozzle being substantially flush, or slightly recessed, with respect to the lower surface of the depositing base, such that the nozzles are also heated by the heating medium circulating through the base to maintain the aqueous sorbitol solution in the depositing nozzles in the relatively narrow temperature range while it is being deposited.

Each depositing nozzle 94 comprises a rectangular array of four depositing apertures 100 therein, FIGS. 14 and 16. Each depositing aperture 100 has an annular beveled surface 102 (beveled at 45°) extending around the lower end of the depositing aperture to form a frusto-conical surface 102 therearound, as shown in FIG. 15 which is an enlarged view of one depositing aperture 100. The annular beveled frusto-conical surface 102 is provided to prevent any accumulation of deposited aqueous sorbitol solution around the lower end thereof. Each depositing nozzle defines a bridge 104 on the lower surface thereof, extending between pairs of the depositing apertures 100. The bridge 104 effectively prevents a flow of cooling air between pairs of the four depositing apertures, to prevent any cooling thereof by the air flow. As illustrated best in FIG. 19, each bridge of each depositing nozzle is aligned similarly in the depositing base such that bridge 104 extends in a direction perpendicular to the linear array of nozzles, to prevent a flow of cooling air in the direction of the linear array.

FIG. 11 illustrates a top plan view of a cover 106 for the hopper 60, which is formed of two center joined cover halves 108, 110. The two cover halves define a set of eight elongated center slots 112, each of which accommodates two piston rods 114 therethrough, as illustrated broadly in FIG. 12. The cover 106 is provided to contain the heat of the aqueous sorbitol solution within the hopper and prevent cooling thereof by the ambient air.

Each piston rod 114 extends downwardly through the hopper to a pump assembly 116, FIG. 18, threadedly engaged in the top of the depositing base in a bore above each nozzle. The manner of operation is similar to that illustrated in FIG. 6. Each piston rod 114 is provided with an annular seat extending around the lower end thereof, and a PTFE O ring 118 is positioned in the annular seat to seal the piston rod relative to a sleeve 120 in the pump assembly 116 and to prevent excessive mechanical shear of the sorbitol material.

Prior to a depositing operation, the aqueous sorbitol solution enters the pump assembly through filling apertures 122 formed therein. A downward stroke of the piston rod 114 past the filling apertures causes hydraulic actuation of a ball valve element 124, FIG. 14, away from an annular valve seat formed thereabove into a central valve passageway 126 extending between the four depositing apertures 100. The ball valve element is movably positioned in the central valve passageway, and is urged upwardly by a biasing spring 128 in compression therebeneath, normally biasing the ball valve element against the annular valve seat. In this arrangement, only a slight opening movement of the valve results in substantially full flow of the aqueous sorbitol solution around the ball element into the central passageway 126 and then through the four valve depositing apertures 100.

In this arrangement, the ball valve element 124 and spring 128 are totally captive within the central bore 126, ensuring a positive cut off by the valve. In contrast thereto, prior art valve arrangements used cross stools or tapered springs which have jumped their seat, such that a positive cut off could not be assured thereby.

Referring to FIGS. 7, 10 and 11, a cylindrical mounting port 130 extends into the cover 106, and serves to mount a heat gun 132 therein which circulates heated air above the aqueous sorbitol solution in the hopper to assist in maintaining the upper surface of the aqueous sorbitol solution in the relatively narrow temperature range to prevent a premature thickening (or skinning) of the solution on the upper surface thereof. Moreover, a hot air duct 134, FIGS. 11 and 12, serves to direct heated air from the heat gun 132 against the upper ends of the piston rods 114 to cause conduction of heat therethrough to the aqueous sorbitol solution to maintain the solution in the relatively narrow temperature range.

In operation of the machine of the present invention, the molds 10 are moved intermittently beneath the depositing head 66 by two chains 136, FIG. 7, positioned on opposite sides of the machine and extending along the upper run thereof, in a manner similar to that of the prior art machine of FIG. 5. The depositing head is mounted above the endless conveyor of mold elements by plates 138 on opposite sides thereof, each of which includes a pair of vertical positioning slots 140, through which mounting bolts 142 extend. A pair of horizontal positioning bolts 144 extend horizontally on opposite ends of each plate 138, and a pair of vertical positioning bolts 145 extend vertically to the bottom of each plate 145. The mounting and positioning bolts 142, 144 and 145 are utilized to precisely position the depositing head both horizontally and vertically relative to the mold 10 positioned therebeneath during each intermittent stoppage.

The piston rods 114 are mounted on a common mounting plate 146, FIG. 12, which is driven intermittently with a vertically reciprocating movement by a pneumatic motor 148 through a standard drive train 150, enclosed within a top housing 152, and having a pair of handwheels 154 engaged therewith, utilized for fine positioning of the drive train and piston rods 114.

Prior to initiating depositing operations, the aqueous sorbitol solution is prepared as described herein, and then placed in the preheated hopper where the heating medium is circulated through the depositing base and hopper. During this preheating stage, the heat gun also supplies circulating heated air to the hopper cavity and against the upper ends of said piston rods, such that the apparatus is preheated to the preferred narrow temperature range prior to initiating depositing operations, which then proceed in a manner as described in detail hereinabove.

In alternative embodiments contemplated herein, a suitable commercial production volume can be achieved by simultaneously operating a plurality of separate depositing bases and hoppers above either separate conveyor belts or a common conveyor belt. Moreover, each depositing base can have a larger or smaller array of nozzles than a two by eight array, as for example a four by eight array of nozzles. One commercial unit contemplated herein comprises four depositing bases and hoppers arranged side by side, with each base having an array of four by eight nozzles.

With larger arrays of nozzles, the number of heating medium channels in the depositing base can be increased to increase the heat exchange capacity. For example, one heating channel can be provided for each row of nozzles and pumping assemblies, extending either widthwise or lengthwise through the base. The heating channels can be provided on each side of each linear row of nozzles and pumping assemblies or can extend directly colinear with each linear array, in which case the pump assembly and/or the nozzles can be positioned to extend through the heating channels such that they are directly immersed in the heating medium circulating therethrough. In these embodiments the heating channels can be connected in a serpentine configuration and the heating channels can be connected either within or exterior of the depositing base.

FIGS. 20 and 21 illustrate one exemplary embodiment as described hereinabove in which a hopper bottom 160 is positioned on a top plate 162 placed over a depositing base 164 having heating medium channels 166 formed therein. Each pump assembly 167 extends through a bore formed in the hopper bottom top plate and depositing base to a nozzle cap 168 which is press fitted into the depositing base at 169 and retained by retaining bar 184 from beneath. Thus, the pump assemblies are directly immersed in the heating medium circulating through the channels 166, and moreover the diameter of the pump assembly is reduced at 165 therein, which provides very good heat exchange characteristics for this embodiment.

The hopper is sealed relative to the heating medium channel by O ring seals 170 and 172, and the pump assemblies 167 threadedly engage the top plate at 174. The pump assemblies 167 and nozzles 168 are sealed by respective O ring seals 176 and 178. A valve ball element 180 and spring 182 therebeneath operate in a manner as explained hereinabove.

FIG. 21 is a partially sectional and partially bottom view of the depositing base 164, and the sectional portion thereof illustrates the serpentine configuration which the heating medium channels form in the depositing base 164. FIGS. 20 and 21 also illustrate another feature of this embodiment wherein retaining pins 184 extend below the depositing base 164 into tangential slots 186 formed on opposite sides of each substantially recessed nozzle 168 to properly align the nozzle and depositing apertures relative to the base.

The depositing apparatus of the present invention was developed for depositing an aqueous sorbitol solution having a crystalline seeding material therein. However, the teachings of the subject invention can also be applied to other deposited products. For example, when depositing a caramel or sugar hard candy piece, an increase in viscosity of the material due to cooling at the nozzle tips can cause "tailing" (instead of a positive cut off of material at the nozzle tips, a long stringy thread of material remains which is broken off during the indexing of the mold). The problem of tailing can vary in degree from an unattractive piece to an unacceptable tablet which must be scraped. The recessed positions of the nozzles in a heated block results in nozzles which can be maintained at higher, more uniform, controllable temperatures which can eliminate the tailing problem.

EXAMPLES

Sorbitol-sweetened deposited hard candy according to the present invention was prepared by cooking about 715 grams of an aqueous sorbitol solution containing not more than about 1.0% mannitol to a temperature of about 325° F., until the moisture level of the mass was about 2.6% and then cooling to a temperature of about 285° F. before mixing about 4.5 grams of malic acid and about 6.4 grams of an aqueous red dye solution. The resulting mixture was further cooled to approximately 210° F. at which point about 1.5 grams of cherry flavor was added, which lowered the temperature to just below 200° F. Approximately 3.0 grams of finely ground crystalline sorbitol (mesh between 60 to 325) was introduced and thoroughly dispersed throughout the sorbitol melt. The resulting mixture was then deposited in an aluminum metal mold as described above which had been heated to a temperature of from about 80° F. to about 85° F. and allowed to set in an environment having a relative humidity level of from about 35 to 50% at 85° F.

After only 15 minutes the deposited sorbitol-containing mass had hardened in the individual cavities sufficiently to allow removal and handling. This set time is surprisingly low in view of the set times disclosed in the prior art of generally no less than about one hour.

Sorbitol-containing hard candies were prepared in accordance with above procedure utilizing different fruit flavors including lemon, pineapple, orange and lime, and using 1.5 grams of finely ground crystalline sorbitol. The resulting candies required only 18 minutes to set sufficiently to demold and handle.

Another sorbitol-sweetened hard candy was produced with a butter rum flavor by cooling the cooked reduced-moisture sorbitol mass to a temperature of about 285° F. and adding about 8 to 15 cc of a concentrated salt solution. The melt was then cooled to a temperature of between about 200° F. and 210° F. before adding about 1 cc of flavor which reduced the temperature to below 200° F. Approximately 1.5 grams of external seeding material was dispersed in the melt which was then deposited as in the previous examples.

The resulting hard candies set sufficiently for demolding and handling in about 20 minutes.

The above examples describe the procedure used to prepare several different desirable flavors, but it is not intended to limit the present invention by such flavors.

While several embodiments and variations of the present invention for a machine for continuously depositing sorbitol-containing hard candy are described in detail herein, it should be apparent that the disclosure and teachings of the present invention will suggest many alternative designs to those skilled in the art.

What is claimed is:

1. Apparatus for depositing a product from a confectionary solution which must be maintained in the depositing apparatus above a given temperature to prevent rapid thickening of the solution at too low temperatures, comprising:
   a. a depositing base, through which the solution is deposited, said depositing base having heating medium passageways formed therethrough, and means for circulating a heating medium through said passageways to maintain the solution above said given temperature;
   b. a plurality of molds posiitoned beneath said base to receive the confectionary solution deposited thereby;
   c. a plurality of depositing nozzles supported in said depositing base to deposit the solution into said plurality of molds, with each nozzle being secured in a substantially recessed position in said depositing base, such that the nozzles are also heated by the heating medium circulating through said base to maintain the solution in said depositing nozzles above said given temperature while it is being deposited through said depositing nozzles; and
   d. a hopper for containing the solution, supported above said deposting base, said hopper including a heating jacket therearound through which a heating medium is circulated to maintain the solution in said hopper above said given temperature.

2. Apparatus as claimed in claim 1, for depositing a hard crystalline candy from an aqueous sorbitol solution having therein a crystalline seeding material, wherein the sorbitol solution must be maintained in the depositing apparatus within a relatively narrow temperature range to prevent rapid thickening of the solution at too low temperatures and destruction of the crystalline seeding material at too high temperatures, comprising:
   a. said hopper being filled with an aqueous sorbitol solution having therein a crystalline seeding material;
   b. a plurality of candy molds positioned below said depositing base; and
   c. means for emptying the candy molds of the deposited sorbitol candies after solidification of the aqueous sorbitol solution in the candy molds.

3. Apparatus for depositing a solution as claimed in claim 1 or 2, further including a hot air heater for circulating heated air above the solution inside the hopper cavity for maintaining the upper surface of the solution above said given temperature to prevent a premature thickening of the solution on the upper surface thereof.

4. Apparatus for depositing a solution as claimed in claim 3, further including a plurality of piston rods, one for actuating each nozzle, each piston rod extending downwardly through said hopper to a pump assembly associated with each depositing nozzle in said depositing base, each depositing nozzle having a valve therein hydraulically acutated by the piston rod and pump assembly during a depositing operation, and means for directing heated air from said hot air heater against the upper ends of said piston rods to cause conduction of heat therethrough to the solution to maintain the solution above said given temperature.

5. Apparatus for depositing a solution as claimed in claim 4, said hot air heater also supplying heated air for circulation inside the hopper cavity and against the upper ends of said piston rods during a preheating period in which the apparatus is preheated prior to initiating depositing operations.

6. Apparatus for depositing a solution as claimed in claim 4, wherein each piston rod has an annular seat extending around the lower end thereof, and an O ring is positioned in said annular seat to seal the piston rod relative to a sleeve in the pump assembly, ensuring positive displacement and cutoff of solution during the depositing operation without creating excessive mechanical shear.

7. Apparatus for depositing a solution as claimed in claim 1 or 2, each depositing nozzle comprising an array of several depositing aperturess therein, each depositing aperture having an annular chamfered surface extending around the lower end of the depositing aperture to form a frusto-conical surface therearound, with the annular chamfered frusto-conical surface preventing an accumulation of deposited solution around the lower end of the depositing aperture.

8. Apparatus for depositing a solution as claimed in claim 7, each depositing nozzle having a central valve passageway extending therethrough centrally between said depositing apertures, and a ball valve element positioned in said central valve passageway and urged upwardly by a biasing spring in compression beneath said ball valve element, biasing the ball valve element upwardly against an annular valve seat, with the ball valve being hydraulically acutated open by a piston rod and pump assembly during a depositing operation, hydraulically pushing said ball valve element away from said valve seat against the force of the biasing spring to allow the solution to flow around said ball valve element through said valve apertures to be deposited in an associated mold positioned therebeneath.

9. Apparatus for depositing a solution as claimed in claim 1 or 2, wherein said plurality of depositing nozzles are arranged in a plurality of rows, and a heating medium passageway is provided in said base for each row of nozzles.

10. Apparatus for depositing a solution as claimed in claim 9, wherein each heating medium passageway provided in said base for each row of nozzles is colinear with the row of nozzles.

11. Apparatus for depositing a solution as claimed in claim 10, each nozzle including a pump assembly associated therewith for pumping the solution through the nozzle, and each pump assembly extending through the colinear heating medium passageway such that the pump assembly is directly immersed in the heating medium to be directly heated thereby.

12. Apparatus for depositing a solution as claimed in claim 9, wherein said heating medium passageways for said plurality of rows are formed into a serpentine configuration through said depositing base.

13. Apparatus for depositing a solution as claimed in claim 9, wherein each row of nozzles is secured in place by at least one retaining pin extending below the depositing base and through tangential slots formed on each nozzle.

14. Apparatus for depositing a solution as claimed in claim 1 or 2, including a plurality of mold elements formed into an endless conveyor of mold elements to be passed beneath said depositing base during successive depositing operations, each mold element having at least one linear array of molds therein, and said depositing base having at least one linear array of nozzles therein positioned above the linear array of molds.

15. Apparatus for depositing a hard crystalline candy from an aqueous sorbitol solution having therein a crystalline seeding material, as claimed in claim 2, wherein said limited temperature range is between 160° F. and 200° F.

16. Apparatus for depositing a hard crystalline candy from an aqueous sorbitol solution having therein a crystalline seeding material, as claimed in claim 15, wherein said limited temperature range is between 191° F. and 194° F.

* * * * *